United States Patent Office 3,263,401
Patented August 2, 1966

3,263,401
CHROMATOGRAPHY
Walter R. Supina, State College, Pa., assignor to Applied Science Laboratories, Inc., State College, Pa.
No Drawing. Filed Nov. 21, 1962, Ser. No. 239,332
6 Claims. (Cl. 55—67)

This invention relates to gas chromatography, in general, and in particular, to improved stationary phases or liquids suitable for use in gas-liquid chromatographic techniques and chromatographic columns prepared therewith.

In selecting a liquid or liquids as candidates for the stationary phase for use in a gas-liquid chromatographic technique, a material is usually selected on the basis of the type of components present in the sample to be analyzed. These are usually known before the analysis is started. In addition, the candidate selected should be a material that is virtually non-volatile at the temperatures employed in the chromatographic column.

In general, for a stationary phase to function properly, it must satisfy two basic requirements, i.e., it must, first, produce a differential partitioning of the components to be separated and, second, it must have a sufficient solvent power for the vaporized components sought to be separated.

In the resolution of compounds of high molecular weight, such as higher fatty acid esters and sterols, the problem is indeed aggravated by the fact that many of the stationary phases heretofore known are not sufficiently stable under the conditions of operation to be considered useful. In addition, many of these materials are not sufficiently selective to be employable with a variety of high molecular weight materials of varying composition.

Accordingly, it is an important object of this invention to provide relatively stable liquids for use as a stationary phase in gas-liquid chromatography.

Another object of this invention is to provide improved chromatographic columns.

A primary object of this invention resides in the provision of a series of stationary phases whose selectivity and other chromatographic properties can be varied in a systematic and controllable manner.

Other objects and attendant advantages of the invention will become further apparent from the following detailed description thereof.

In brief, the present invention resides, in part, in the discovery that improved stationary phases possessing improved chromatographic capabilities comprise the polyester reaction product of a polyol and a silicon-containing compound hereinafter more fully described.

The new stationary phases of the present invention are organosilane intermediates having a molecular structure comprising a siloxane portion

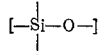

containing monovalent silicon-bonded members of the group consisting of hydroxy, hydrocarbonoxy, aromatic and aliphatic groups interconnected by divalent residues of a polyhydric alcohol. To be more specific, the organosilanes react with the OH groups of the glycol. Once this reaction occurs, the organosilane is bound to the molecular grouping of the glycol in the positions formerly occupied by the OH groups of the glycol. In this reaction, this molecular grouping of glycol, in the final stationary phase reaction product, is termed the "moiety" of the glycol. This reaction may be illustrated by the following general equation in which SiA represents a conventional silane radical and Et the conventional ethyl group:

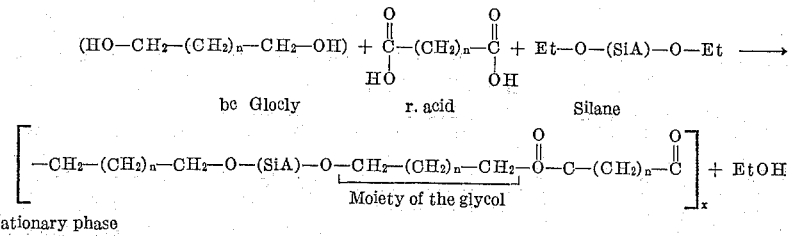

The "moiety" of the glycol is clearly indicated. The "moiety" of a polyhydric alcohol or other like compound would be correspondingly similar.

The silicon-containing compounds which find immediate and practical utility in the manufacture of the stationary phases of the invention include silanes such as diphenylsilanediol, diphenyldiethoxysilane and beta-cyanoethylmethyldiethoxysilane as well as polysiloxanes. The preferred siloxanes employed as starting materials are relatively low molecular weight, partially condensed, phenyl polysiloxanes or phenyl and methyl polysiloxanes containing reactive hydrocarbonoxy groups, preferably alkoxy groups, bonded to some or all of the silicon atoms thereof. These preferred siloxane intermediates have a hydrocarbon group to silicon atom ratio of from 1.0 to 1.6 where, of course, the hydrocarbon group may be phenyl or a mixture of methyl and phenyl groups. In the latter instance, where the polysiloxane contains both phenyl and methyl groups bonded to silicon atoms, not over 40% of the total number of such groups are methyl groups and preferably the mol percent of ethyl groups present should not be over 25%. The hydrocarbonoxy groups bonded to the silicon atoms of the intermediate are present in an amount such that the hydrocarbonoxy group to silicon atom ratio will be in a range of from about 0.2 to as high as 2 and generally will be in the range of from about 0.3 to 1.5. However, in no event will the percent by weight of hydrocarbonoxy groups present be less than 5% nor more than 40% of the weight of the polysiloxane. Polysiloxanes of the molecular composition described above have a molecular weight of from 400 to 4,000. Other polysiloxanes can be employed if desired.

The manner whereby the desired polysiloxanes containing silicon-bonded hydrocarbonoxy radicals can be prepared may vary in accordance with several known techniques as disclosed, for example in U.S. Patent No. 2,996,479. In general, as starting materials, any of the well known hydrolyzable derivatives of phenyl silanes or mixtures of hydrolyzable derivatives of phenyl silanes and methyl silanes can be employed. Such silane derivatives have the valences of the silicon atom thereof satisfied by only the hydrocarbon groups specified and by any of the known hydrolyzable radicals or elements such as halogens or alkoxy, aryloxy and amino radicals. Thus, the silane derivatives may contain from 1 to 3 phenyl or methyl groups and from 2 to 1 hydrolyzable groups bonded to the silicon atom.

To prepare the siloxane intermediates employed in the processes of the invention from alkoxy silanes, a controlled hydrolysis and partial condensation method is employed. Hydrolysis is conducted by treating a solvent solution of an alkoxy silane, at carefully controlled temperatures, with an amount of water less than that normally required to effect complete hydrolysis of the derivative. Condensation occurs, to some extent, concurrently with hydrolysis and the degree thereof may be controlled by the addition of a catalyst or by varying the temperature.

When other hydrolyzable silanes such as the halosilanes are employed as the starting materials one of two procedures may be followed to prepare the polysiloxanes. For example, these hydrolyzable derivatives may be initially reacted with an alcohol, preferably an alkanol, to produce an alkyloxy silane which may be subsequently hydrolyzed and condensed as disclosed above, or they may be treated with an alcohol and water mixture in the presence of a solvent. In the latter instance, the total amount of alcohol and water employed is such as to completely react with the available hydrolyzable radicals of the silane derivative. Thus, both the water and alcohol react with the silane and the hydrolyzable radicals are replaced by either an alkoxy radical or by a hydroxyl radical. The hydroxyl radicals condense intermolecularly to form low molecular weight alkoxy-containing polymers.

The silane reacts with the polyhydric alcohol during the reaction process. The polyols which find utility in the manufacture of the stationary phases of the invention are organic compounds having at least two hydroxyl groups or both alcoholic and phenolic hydroxyl groups. Typical polyols can be represented by the general formula:

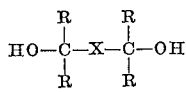

R is an alkyl group or hydrogen and can be the same or different for all R's in the molecule. X can be a single bond or a divalent group composed of a carbon atom or group of carbon atoms interconnected by a single or multiple bonds and to which such groups as hydrogen, alkyl, hydroxyl, cyclic and the like or combinations thereof can be attached. X can also represent such divalent groups as oxyalkylene or polyoxyalkylene groups. X, as a divalent group, may represent a carbon atom group which contains sulfur. It can also represent cyclic groups, such as phenylene, cyclohexylene and the like. The R's and X together with the carbon atoms, i.e., the C's of the formula, can represent a cyclic group such as phenylene, cyclohexylene and the like. The presence of other groups, with the exception of tautomeric enolic groups, not specifically listed herein and not participating in the reaction, is by no means harmful and, in fact, can be useful in developing special properties in the compositions. Mixtures of polyols or only one polyol can be employed, if desired.

Representative polyols which can be employed in the manufacture of the stationary phases are polyhydric alcohols, such as ethylene glycol, diethylene glycol, polyethylene glycol, polypropylene glycol, tripropylene glycol, polypropylene glycol, polyethylene-polypropylene glycols, trimethylene glycol, butanediols, pentanediols, 2-ethyl-1,3-hexanediols, 2-methyl-2,4-pentanediol, 12,13-tetracosanediol, 2-butene-1,4-diol, 2-methoxymethyl-2,4-dimethyl-1,5-pentanediol, diethanolamine, triethanolamine, glycerol, polyglycerols, pentaerythritol, sorbitol, polyvinyl alcohols, cyclopentanediols, cyclohexanediols, inositol, trimethylolphenol, and polyhydric phenols, such as dihydroxytoluenes, resorcinol, bis(4-hydroxyphenyl)-2,2-propane, bis(4-hydroxyphenyl) methane, the polyhydric phenolic formaldehyde condensation products, and the like. Polyols which are free of acetylenic unsaturation and composed of carbon, hydrogen and oxygen combined as hydroxyl oxygen or ether oxygen connecting two otherwise unconnected carbon atoms and having not more than 24 carbon atoms are preferred.

The polycarboxylic acid compounds which can be employed in the manufacture of the stationary phases of the invention include aliphatic, aromatic and cycloaliphatic dicarboxylic acids such as, for example, succinic acid, glutaric acid, adipic acid, pimelic acid, suberic acid, azelaic acid, sebacic acid, alkylsuccinic acids, alkenylsuccinic acids, maleic acid, fumaric acid, itaconic acid, citraconic acid, mesaconic acid, glutaconic acid, muconic acid, ethylidenemalonic acid, isopropylidenemalonic acid, allylmalonic acid, 1,2-cyclohexanedicarboxylic acid; 1,4-cyclohexanedicarboxylic acid, 2-carboxy-2-methylcyclohexaneacetic acid, phthalic acid, isophthalic acid, terephthalic acid, 1,8-naphthalenedicarboxylic acid, 3-carboxycinnamic acid, 1,2-naphthalene dicarboxylic acid, tetrahydrophthalic acid, and tetrachlorophthalic acid. Preferred aliphatic dicarboxylic acids include aliphatic dibasic acids containing from five through ten carbon atoms.

The process whereby the stationary phases are generally prepared can be of at least two general techniques, one of which involves the direct combination of the silicon-containing compound and alkyd intermediates at high temperatures without the use of a solvent. In general, this procedure involves charging the polyol and polycarboxylic acid to a reaction flask and reacting the same to an acid number of 10 or less, whereupon the silicon-containing compound is added and the cook is continued. The reaction between the excess alcohol and the silicon occurs and a Si—O—C linkage is formed between the alkyd and the silicon with alcohol being distilled out. As the reaction continues, the copolymer increases in viscosity and a noting of the amount of alcohol evolved at any given time is a convenient method of following the reaction. It is preferred, however, to charge the ingredients, i.e., the polyol, the silicon-containing compound and the poly-carboxylic acid to a reaction flask connected to a condenser and heating the same to the desired temperature, preferably a temperature within the range of from 125° C. to about 250° C. By-products are stripped off and heating is continued until the increase in viscosity of the contents of the flask indicates that bodying is imminent. The product is then conveniently recovered by any suitable means and prepared for use as by dissolving in a solvent, if desired. The relative amounts of polyol to be reacted with the silicon-containing compound can be varied over a wide range to provide a variety of polyester-polysiloxanes having varied combinations of physical characteristics to suit the particular need. In general, however, it should be observed that in formulating the silicon-containing compound with the polyol and poly-carboxylic acid, an excess of hydroxyl groups should be provided so as to provide a plurality of suitable reactive sites for chemical linkage with the silicon-containing compound.

The type of chromatographic columns which can be employed can be selected from those having any desired variety of column dimensions. In general, those columns having an internal diameter of from 4 to 8 millimeters have been found to yield satisfactory results although columns having internal diameters of lower or greater than the above-prescribed dimensions can be utilized.

As previously noted, the stationary phase is employed as a thin film on the carrier, generally in a weight ratio of stationary phase to carrier of 0.05 to 0.5:1 and particularly from 0.5 to 25 weight percent depending on the weight of the column packing material. The particular means of obtaining this thin film is not critical. However, one preferred method comprises employing the stationary phase in a volatile solvent, saturating the inert porous carrier with the solvent-stationary phase mixture and thereafter air drying the impregnated solid to remove the volatile solvent.

As the inert carrier, any porous solid which will not react or, in itself, selectively adsorb the constituents of the gaseous mixture may be employed. Typical of the type of porous inert solids which may be used as carriers for the stationary phase are kieselguhr, firebrick, and the like.

The temperature at which the column is maintained is not necessarily a critical feature of the invention and can range up to 220° C. If desired, the column temperatures can be increased in accordance with accepted techniques employed in chromatographic analyses.

The column pressures employed in carrying out the practice of this invention can be any pressure difference necessary to obtain the desired gas rate between the column inlet and outlet. Sometimes, it is advisable to maintain either the inlet or outlet at prevailing atmospheric pressure or, if desired, both the inlet and outlet pressures can be controlled. In general, the rate of transport is roughly proportional to the pressure differential through the column and not necessarily dependent on the value of the absolute pressure so that any convenient pressures can be employed. In general, pressure inlet to outlet ratios in the range of from 1.25:1 to about 3:1 will suffice to achieve satisfactory results in accordance with the invention.

The sample of material to be analyzed can be introduced in accordance with the various techniques in the art of sample introduction. For liquid samples, the micro-syringe method with a needle through a rubber serum cap is satisfactory. If desired, the sealed ampoule technique can also be used. For gaseous samples the displacement of a known volume from a calibrated chamber by carrier gas is by far the most generally preferred technique for introduction of a sample for analysis.

The chromatographic columns prepared in accordance with procedures of this invention are useful in the analysis of complex mixtures of fatty acid esters, such as alkyl esters of higher fatty acids containing from 18 to 20 carbon atoms, or mixtures of steroids and the like.

The following examples reflect a method of preparing the stationary phases and the data obtained with several of the stationary phases in the preparation of columns which were used to separate a mixture of methyl esters of fatty acids.

EXAMPLE 1

To a reaction flask were charged 2300 grams of ethylene glycol (equivalent weight of 59.04), 3540 grams of succinic acid (equivalent weight of 31.0) and 938 grams of a low molecular weight organopolysiloxane (equivalent weight of 225) having a nominal ethoxy content of 20 percent, an approximate molecular weight of 700, an average of three ethoxy groups per molecule and a functionality of 3. The viscosity of the organopolysiloxane is 380 centistokes at 25° C. and has a Gardner color of 5.

The materials were reacted under a nitrogen atmosphere at barometric pressure at a temperature of 150° C. for a period of 2.5 hours whereupon the temperature was raised to 200° C. and heating continued for an additional 3.0 hours.

The reaction product was then cooled, dissolved in chloroform and filtered to remove insolubles. The chloroform was then evaporated and the modified organopolysiloxane collected for use as a stationary phase.

EXAMPLE 2

To a reaction flask were charged 2582 grams of ethylene glycol (equivalent weight of 59.04), 3540 grams of succinic acid (equivalent weight of 31.0), 2565 grams of a low molecular weight organopolysiloxane (equivalent weight of 225) having a nominal ethoxy content of 20 percent, an approximate molecular weight of 700, an average of three ethoxy groups per molecule and a functionality of 3. The viscosity of the organopolysiloxane is 380 centistokes at 25° C. and has a Gardner color of 5.

The materials were reacted under a nitrogen atmosphere at barometric pressure at a temperature of 150° C. for a period of 2.5 hours whereupon the temperature was raised to 200° C. and heating continued for an additional 3.0 hours.

The reaction product was then cooled, dissolved in chloroform and filtered to remove insolubles. The chloroform was then evaporated and the modified organopolysiloxane collected for use as a stationary phase.

EXAMPLE 3

Two columns were selected, each being glass tubes 6 feet long and 4 millimeters inside diameter. They were packed with a 100/140 mesh GAS-CHROM P support which had deposited thereon the modified organopolysiloxanes of Examples 1 and 2 at the rate of approximately 0.18 gram of organopolysiloxane per gram of support. Separations were performed with each column at a temperature of 205° C. and an inlet pressure of 20 p.s.i.g. at a flow rate of approximately 60 cc./min. and the following data obtained:

*Table I*

| Organopolysiloxane | Column 1 Ex. 1 | Column 2 Ex. 2 |
| --- | --- | --- |
| Retention Time (min.): | | |
| Air | 0.3 | 0.4 |
| Methyl stearate | 7.7 | 11.4 |
| Retention time relative to Methyl Stearate (Ratio): | | |
| Methyl oleate | 1.18 | 1.14 |
| Methyl linoleate | 1.50 | 1.35 |
| Methyl linolenate | 1.99 | 1.69 |
| Methyl arachidate | 1.70 | 1.82 |

From the above data, it is apparent that varying the amount of polysiloxane in the stationary phase will cause variation in the retention times of the esters of fatty acids analyzed. Hence, the selectivity or separation of various components in a complex mixture can be varied in a predictable and controllable manner by varying the proportion of polysiloxane in the polyester molecule.

Other silicones of the class described above can be readily employed in making polyesters suitable for use as stationary phases for chromatographic columns by reaction with polyhydric alcohols and polycarboxylic acids mentioned hereinbefore in the manner exemplified in Examples 1 and 2.

Representative siloxanes and polysiloxanes of the class described above are set forth in the following Table II in terms of their physical properties.

*Table II*

| | Diphenyl Diethoxy Silane | 1 ° | 2 ° | 3 ° |
| --- | --- | --- | --- | --- |
| Percent ethoxy | 33 | 36.5 | 25 | 5 |
| Nominal | 100 | 100 | 100 | 60 |
| Viscosity, cstk. 25° C | 10 | 20 | 30 | 20-60 |
| Solvent | | | | Xylene |
| Mol. Wt. (Approx.) | 272 | 500 | 1,100 | 2,000-5,000 |
| Functionality [a] (Approx.) | 2.0 | 4 | 6 | 3 |
| Equivalent Wt.[b] | 136 | 125 | 180 | 800 |
| Color, Gardner | 4 | 1 | 2 | 2 |

[a] Defined as average number of ethoxy groups per molecule =

$$\frac{\text{Molecular Weight} \times \text{percent OC}_2\text{H}_5}{4,500}$$

[b] Weight of intermediate which contains one mole of $OC_2H_5$ =

$$\frac{4,500}{\text{percent OC}_2\text{H}_5}$$

° The compounds so designated are polymers having the general structural formula:

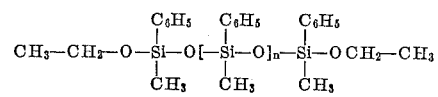

Having thus described the subject matter of my invention what is desired to be secured by Letters Patent is:

1. The method of separating complex mixtures into their components which comprises passing said mixture in a vapor phase with an inert carrier gas through a liquid partition zone containing on an inert carrier a film of a stationary phase comprising the polyester reaction product of a silicon-containing compound, a polyol and a polycarboxylic acid.

2. The method of separating complex mixtures into their components which comprises passing said mixture in a vapor phase with an inert carrier gas through a liquid partition zone containing on an inert carrier a film of a stationary phase comprising the polyester reaction product of an organosilane intermediate having a molecular structure comprising a siloxane portion containing monovalent silicon bonded members of the group consisting of hydroxy, hydrocarbonoxy, aromatic and aliphatic groups interconnected by divalent residues of a polyhydric alcohol.

3. The method of claim 2 wherein the organosilane intermediate is diphenylsilanediol.

4. The method of claim 2 wherein the organosilane intermediate is beta-cyanoethylmethyl-diethoxysilane.

5. The method of claim 2 wherein the organosilane intermediate is a polysiloxane having a molecular structure comprising a plurality of polysiloxane portions said polysiloxane portions having a molecular weight of from 400 to 4000, at least some of said polysiloxane portions containing residual hydrocarbonoxy groups selected from the class consisting of alkoxy and aryloxy groups and containing from 1.0 to 1.6 monovalent silicon-bonded hydrocarbon groups per silicon atom, said groups being selected from the class consisting of methyl and phenyl groups and the amount of said silicon-bonded methyl groups present varying from 0% to about 40% of the amount of said silicon-bonded phenyl groups present.

6. The method of claim 2 wherein the organosilane intermediate is a polysiloxane having a molecular structure comprising a plurality of polysiloxane portions, said polysiloxane portions having a molecular weight of from 400 to 4000, at least some of said polysiloxane portions containing residual ethoxy groups and containing from 1.0 to 1.6 monovalent silicon-bonded hydrocarbon groups per silicon atom, said hydrocarbon groups consisting of phenyl and methyl groups and the amount of said silicon-bonded methyl groups present varying from 0% to about 40% of the amount of said silicon-bonded phenyl groups present.

References Cited by the Examiner
UNITED STATES PATENTS

| | | | |
|---|---|---|---|
| 2,996,479 | 8/1961 | Sterman | 260—46.5 |
| 3,074,881 | 1/1963 | Jones | 55—67 X |
| 3,116,161 | 12/1963 | Purnell | 55—67 |

REUBEN FRIEDMAN, *Primary Examiner.*

C. N. HART, *Assistant Examiner.*